July 22, 1958 W. L. GASKELL 2,844,173
ARBOR SAW WITH SINGLE HANDLE CONTROL OF TILT AND ELEVATION
Filed Sept. 13, 1954 3 Sheets-Sheet 1

INVENTOR.
Walter L. Gaskell
BY
Harness, Dickey & Pierce
ATTORNEYS.

July 22, 1958 W. L. GASKELL 2,844,173
ARBOR SAW WITH SINGLE HANDLE CONTROL OF TILT AND ELEVATION
Filed Sept. 13, 1954 3 Sheets-Sheet 2
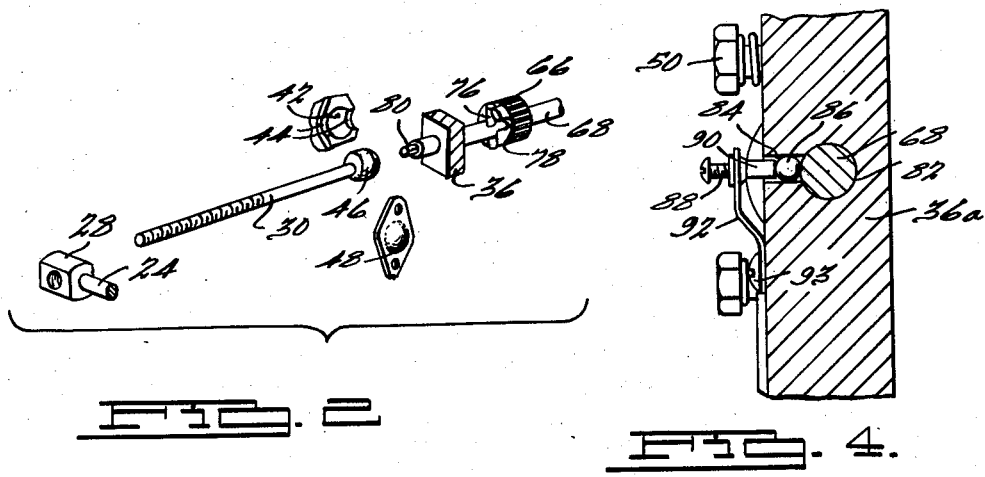
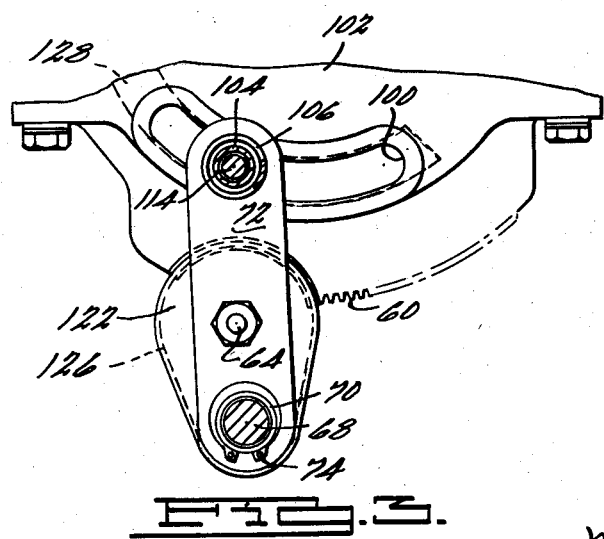
INVENTOR.
Walter L. Gaskell
BY
Harness, Dickey & Pierce
ATTORNEYS July 22, 1958  W. L. GASKELL  2,844,173
ARBOR SAW WITH SINGLE HANDLE CONTROL OF TILT AND ELEVATION
Filed Sept. 13, 1954  3 Sheets-Sheet 3

INVENTOR.
Walter L. Gaskell
BY
Harness, Dickey & Pierce.
ATTORNEYS.

United States Patent Office 2,844,173
Patented July 22, 1958

2,844,173

ARBOR SAW WITH SINGLE HANDLE CONTROL OF TILT AND ELEVATION

Walter L. Gaskell, Ypsilanti, Mich., assignor to King-Seely Corporation, Ann Arbor, Mich., a corporation of Michigan Application September 13, 1954, Serial No. 455,588

3 Claims. (Cl. 143—36)

This invention relates to power-driven machinery, and more particularly, to an adjustable cutting device.

The object of this invention is to improve and simplify mechanism for adjusting the position of a cutting device.

A feature of this invention is an improved unitary means for controlling two positional characteristics of a cutting device.

Another feature of this invention is an improved disengageable driving connection between a control shaft and a controlled shaft.

Another feature of this invention is an improved disengageable driving connection between a shaft and a gear on that shaft.

A further feature of this invention is an improved means for selectively establishing driving engagement between a drive pin and a gear.

A further feature of this invention is an improved means for adjusting the force required to move a control shaft longitudinally.

Another feature of this invention is an improved means for shielding operating parts of a saw mechanism from dirt, sawdust and wood chips.

Another feature of this invention is an improved means for locking a tilting-arbor saw in any selected tilted position.

A further feature of this invention is an improved means for adjusting the frictional engagement between certain of the operating parts of a saw tilting mechanism to permit ready tilting of the saw but to prevent unintentional movement of the tilting mechanism.

The manner of accomplishment of the foregoing object and features will be understood and additional objects and features will be perceived from consideration of the following detailed description of exemplary embodiments of the invention when read with reference to the accompanying drawings, in which:

Fig. 2 is a perspective and partially exploded view of certain details of the operating mechanism of the machine shown in Fig. 1;

Fig. 4 is a sectional view taken substantially along the line 4—4 of Fig. 1 of the drawings; and Fig. 5 is a sectional view of a modified form of the invention.

Figure 1:
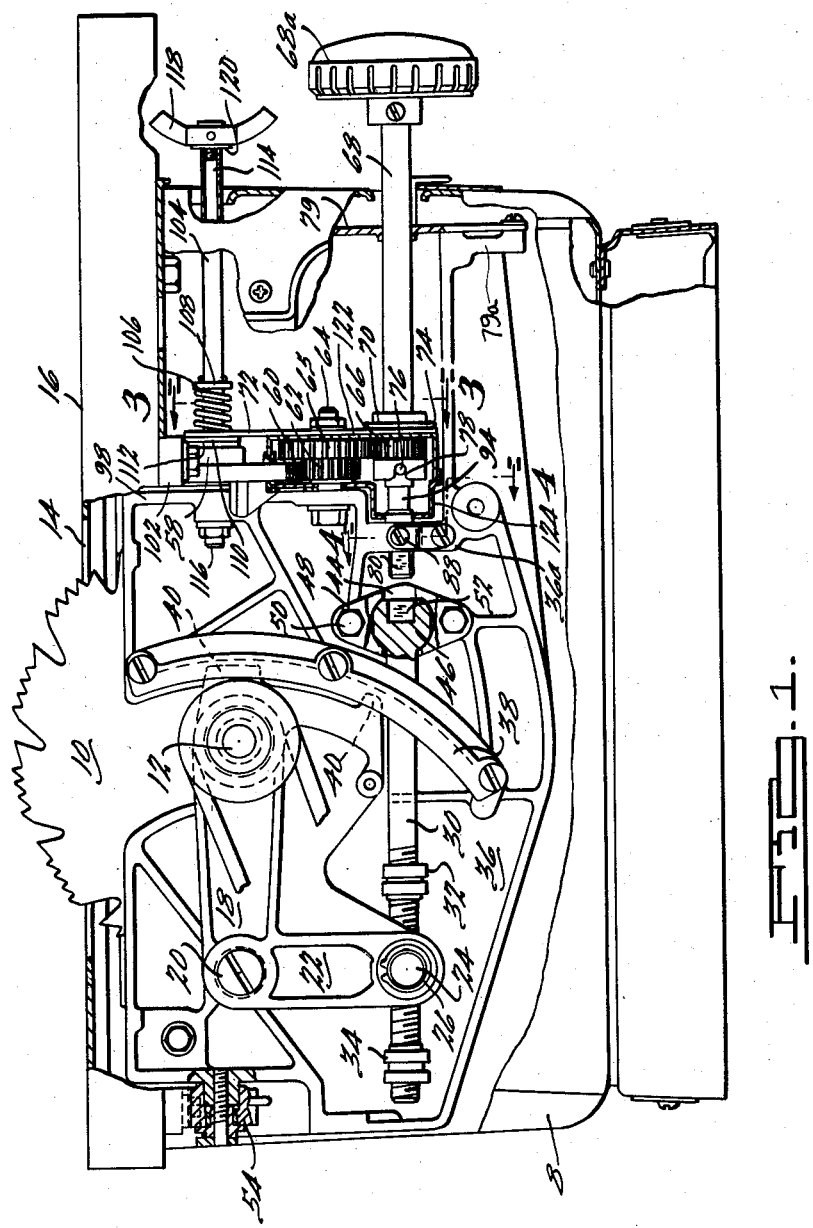
Figure 1 is a side elevational view, taken in partial section, of a machine embodying the principles of the invention.

While the principles of the invention may be applied in a variety of ways and to diverse types of mechanisms, they are exemplarily embodied in a tilting arbor circular wood saw and constitute an improvement upon the mechanism which is the subject matter of my copending application Serial No. 76,937, filed February 17, 1949, and issued November 30, 1954, as Patent No. 2,695,638, of which the present application is a continuation-in-part. The basic saw structure in which the present invention is embodied is disclosed in that application and reference may be made thereto for a detailed description of those elements which are described but generally herein.

In both the referenced application and the subject application, a single shaft is employed to control both the elevating mechanism and the tilting mechanism of the saw. In the referenced application, one gear, mounted upon the control shaft, is selectively engaged with or disengaged from a second gear by longitudinal movement of the control shaft. It has been found that care must be exercised in the design and manufacture of the co-operating gears to reduce the possibility of gear chipping or undue gear wear resulting from improper initial engagement when the gears are moved laterally relative to one another to establish a meshing relationship.

As one facet of the present invention, the two cooperating gears are maintained continuously in mesh, with means being provided selectively to establish a driving engagement between the control shaft and one of those gears. Other improvements and modifications will become apparent from the following detailed description of the modified and improved structure.

The saw in which the present invention is embodied comprises a circular blade 10 mounted upon a spindle or arbor 12 and passing through a slot 14 in a table or working surface 16, although other physical relationships between the working surface and the saw blade sometimes exist in practice. The material to be worked upon is rested upon the surface 16 and is moved into engagement with the blade 10 to permit the performance of the cutting operation. The table top is bolted or otherwise removably affixed to the sheet metal cabinet or casing 8.

It is desirable that the positional relationship between the blade 10 and the surface 16 be adjustable so that the positional relationship between the blade 10 and the material to be worked upon may be controlled. This adjustment normally takes the form of a means for elevating or depressing the blade 10 relative to the surface 16 and a means for tilting the blade 10 about a horizontal axis perpendicular to its axis of rotation. Obviously, such adjustment of the positional relationships may either be accomplished by moving the blade 10 or the surface 16 and both methods of adjustment find application in practice. However, the provision of an arbor which may be either elevated, depressed or tilted is employed in the embodiment of the invention shown.

To permit the elevation or depression of the blade 10 relative to the surface 16, the ball-bearing mounted spindle or arbor 12 is supported at the end of one arm of a bell crank spindle support 18, that bell crank being pivoted about a pivot bearing 20 affixed to the body or frame member 36. The lower arm 22 of the bell crank 18 is apertured to accept a saw-elevating stud 24 which is held in position upon the bell crank 18 by means of a C retaining ring 26.

The stud 24 is integral with a saw-elevation nut 28 (Fig. 2) comprising a block of material having a tapped aperture therein. The elevation nut 28 engages a threaded shaft 30 which is mounted to prevent translatory motion thereof in a manner hereinafter to be described. As the saw-elevation shaft 30 is rotated in a clockwise direction, assuming the employment of right-hand threads, the bell crank 18 is rotated in a counterclockwise direction about its pivotal axis 20 to move the spindle 12, and hence the saw blade 10, upwardly relative to the surface 16 to any selected elevated position. Conversely, if the saw-elevation shaft 30 is rotated in a counterclockwise direction, the bell crank 18 is rotated clockwise about its pivot 20 to depress the saw blade 10. The limits of such elevation and depression may be controlled by suitably adjusting stop nuts 32 and 34, respectively.

The body or frame 36 also supports an arcuate, slotted guide member 38. The forwardmost end of the bell crank 18 is provided with one or more projections 40 engaging the slot in guide member 38, precisely to define the course of travel of the bell crank 18 and, hence, of the spindle 12.

The frame 36, which is preferably a cast member, is also provided with a hemispherical recess 42, as may best be seen in Fig. 2 of the drawings. Portions 44 of the hemispherical recess 42 are cut away to permit the passage of shafting therethrough. The forwardmost end of the saw-elevation shaft 30 terminates in a substantially spherical member 46 engaging the hemispherical recess 42, a portion of the shaft 30 passing through the rear aperture 44 in that recess. The spherical portion 46 is maintained in position by means of a spring-biased tension plate 48 which is also provided with a hemispherical depression or concavity to conform to the surface of the spherical portion 46. A plate 48 is affixed to the frame 36 by means of spring-biased bolts 50, those bolts being tightened adequately to provide an optimum pressure on the surface of the spherical member 46. It will be seen that the provision of the spherical member 46, held in position as shown, permits rotation of the shaft 30 and while preventing translatory motion of that shaft permits it to tilt slightly as the pin 24 is swung through an arc upon movement of bell crank 18 so as to prevent binding of the threads.

The forwardmost end of the spherical portion 46 is provided with a socket 52 having a substantially square cross section and an enlarged or outwardly flared mouth to freely accept a driving member in a fashion hereinafter to be described.

In order to permit tilting of the blade 10, the frame 36 is supported by means of mating arcuate surfaces on a rear trunnion 54 that is bolted to the underside of table plate 16. At the front, the frame 36 is provided with an arcuate element engaging an arcuate slot in a trunnion member 58 which is bolted or otherwise affixed to the table 16. The arcuate slots and surfaces of the trunnions and frame 36 permit tilting of the saw blade about an axis lying on the surface of the table and coplanar with the blade. Thus, as may most clearly be seen in Fig. 5 of the drawings, trunnion member 102 is fixed to the table 16 by means of screws 132, and is provided with an arcuate slot 100 extending through the front face thereof and an enlarged arcuate slot 134 extending through the rear face. A projection 98 of the body 36 is provided with an arcuate portion 138 engaging the arcuate slot 134 in the member 102.

Member 102 has an arcuate lower surface provided with a series of teeth 60 (Fig. 3) positioned to engage the teeth upon a gear 62 rotatably mounted upon a post or shaft 64 which is fixed to a rib 64a in the tiltable frame 36. Gear 62 drives or is integral with a larger gear 65 (Fig. 2) (the two may be a cluster gear), the teeth of which continuously engage the teeth upon a cylindrical gear member 66.

The post or shaft 64 engages an aperture in a strap or plate 72 and rigidly supports that plate with relation to the rib 64a, and hence with relation to the frame 36. Gear member 66 is provided with a shoulder or reduced diameter portion 70 (Figs. 1 and 3) passing through a second aperture in plate 72. The portion 70 is provided with an annular groove to accept a C clip retaining ring 74 which abuts the opposite face of plate 72 from the gear teeth so that gear 66 is held by plate 72 in fixed axial position while being permitted to rotate.

Both the elevating and depressing of the blade 10 and the tilting of that blade are controlled by a single shaft 68, provision being made to permit longitudinal motion of that shaft between an inward and an outward position. In one longitudinal position of the shaft 68, driving engagement is established with the elevating and depressing mechanism; in the other position, driving engagement is established with the tilting mechanism.

Shaft 68, provided with a detachable handle 68a (Fig. 1), passes through an aperture in a front plate 79, secured by screws or the like to a front extension 79a of the frame 36, is slidable in an aperture in rib 36a (Fig. 5) integral with frame 36, and engages the central bore of gear 66. Since gear 66 is rigidly supported against translatory motion by plate 72, gear 66 supports and serves as a bearing surface for control shaft 68, shaft 68 being slidable along its longitudinal axis within the gear 66.

As may best be seen in Figs. 1, 2 and 5 of the drawings, the control shaft 68 is radially apertured to accept a drive pin 76 which protrudes from either side of that shaft. The left-hand or rearward edge of the gear member 66 is provided with a series of radial slots or grooves 78 to accept the drive pin 76. Preferably, two pairs of the grooves 78 are provided to permit the drive pin 76 to engage a pair of those grooves in either of four positions, thereby to permit the drive pin 76 to be engaged by a groove 78 with a maximum of a 45° rotation of the control shaft 68. The innermost surfaces of the grooves 78 conform in shape to that of the drive pin 76, i. e., they are semicircular. Beyond this innermost portion, the groove width increases substantially, thereby forming a camming surface to permit ready engagement between the pin 76 and either pair of the slots 78.

The left-hand end of the control shaft 68 terminates in a driving stud portion 80 which is substantially square in cross section, but preferably the edges of the square are deleted to facilitate engagement, when the shaft is moved to the left to its inward position, with the corresponding socket 52 in the spherical portion 46. The socket 52 is slightly larger than the stud 80 so that connection and disconnection of shaft 68 and sphere 46 can be made even though shaft 68 is not exactly coaxial with shaft 30 (as when the latter is tilted slightly during elevation of blade 10).

Movement to the right, to the position shown in the drawings, terminates when the drive pin 76 is completely in engagement with a pair of the slots 78 in the gear member 66.

Since, in that position, shaft 68 and gear 66 are interlocked by the drive pin 76, rotation of the shaft 68 will produce corresponding rotation of the gear member 66 to drive the gear 65 and 62. Being meshed with teeth 60 on the trunnion 58 the gear 62 will move transversely carrying shaft 64 on which it is rotatably mounted and since the latter is secured in the frame rib 64a, the frame 36 and all portions carried thereby will tilt about the axis of its bearing in trunnions 54 and 58. As a consequence, the spindle 12 and blade 10 are tilted about a horizontal axis extending substantially perpendicularly to the axis of the spindle 12.

As the control shaft 68 is moved to the left, the drive pin 76 is disengaged from the slot 78 so that rotation of the control shaft 68 will not produce corresponding rotation of the gear member 66. If the control shaft 68 is moved still further to the left, the drive stud 80 thereon engages the socket 52 in the spherical portion 46 so that upon rotation of the shaft 68, the shaft 30 is rotated to elevate or depress the saw blade 10 in the manner hereinbefore described.

It will therefore be seen that when the control shaft 68 is rotated while in its extreme rightward position, the saw blade 10 will be tilted relative to the surface 16, that when the shaft 68 is in an intermediate position along its longitudinal axis, no effect will be produced by rotation of that control shaft, and that when the controy shaft 68 is in its extreme leftward position the blade 10 will be elevated or depressed by rotation of the shaft 68, no tilting action occurring during elevation or depression and no elevating or depressing action occurring during tilting.

It is desirable that means be provided to impose an additional load on the shaft 68 to assist in precise setting of the rotational position of that shaft, to aid in maintaining the shaft 68 in any position in which it is set, and to control longitudinal motion of the shaft 68 so that any displacement of that shaft along its longitudinal axis must be intentional. This means comprises a spring-biased detent which may best be seen in Figs. 1 and 4 of the drawings. The shaft 68 passes through aperture 82 in web 36a in the frame member 36. The web 36a is also provided with an aperture 84, extending perpendicularly to the aperture 82, of sufficient diameter to accept a ball 86. The ball 86 is pressed into engagement with the control shaft 68 by means of a screw 88 engaging an extended nut 90 which is supported by a cantilever spring 92 screwed at 93 or otherwise rendered integral with the frame 36. The spring 92 is properly conformed to force the extended nut 90 toward the control shaft 68 so that the adjustable screw 88 mounted in that nut 90 will exert a force on the ball 86 to, in turn, exert a force on the control shaft 68.

The shaft 68 is preferably provided with a reduced-diameter portion 94, the transition surface between the larger-diameter portion of shaft 68 and the reduced-diameter portion 94 being inclined to serve as a camming surface. When the control shaft 68 is in driving engagement with the threaded shaft 30, little additional force is required for this engagement to be maintained and little force is applied since the ball 86 then overlies the reduced-diameter portion 94. As the shaft 68 is drawn to the right, the ball 86 will engage the camming surface, providing a manually sensible indication, and thereafter the ball 86 will be in engagement with the larger-diameter portion of the shaft 68. This additional force serves to hold the shaft 68 in position, with the pin 76 in engagement with the bottom of a radial slot 78, despite the fact that the edges of that slot are conformed to cam the pin 76 into position to facilitate engagement therebetween and hence also tend to cam the pin 76 out of engagement therewith.

It will be noted that inasmuch as the front and rear trunnions 58 and 54 for tilt frame member 36 are bolted to the table plate 16 and the shaft 30 and 68 are entirely carried thereby, having no connection with the casing or cabinet 8 of the saw, distortion of the cabinet is not transmitted to the shafts and cannot affect adjustment of the saw blade. Likewise, assembly of the saw is facilitated since the table and operating parts, e. g., trunnions 54, 58, frame 36, shafts 30, 68, etc., can be manufactured as a subassembly and then inserted in the cabinet, it being understood that the handle 68a is mounted later.

Means are provided to lock the tilting mechanism at any selected angle. In the mechanism shown in Figs. 1 and 3, a tubular shaft 104 passes through an aperture in the plate 72 and terminates at the slot 100 in the member 102. A pair of washers 110 and 112 are interposed between the face of the member 102 and the plate 72, the inner washer 112 preferably being fiber. Shaft 104 extends exteriorly of the saw through an aperture in the cabinet 8. A helical spring 106 is positioned upon the tubular shaft 104. At its right-hand or outer end, the spring 106 abuts a washer 108 staked or otherwise fixedly held to the shaft 104. At its left-hand or inner end, spring 106 abuts plate 72. A solid rod 114 is carried within the tubular shaft 104, extending through the slot 100 and being provided with a threaded end 116 engaging a tapped aperture in the member 98. At its outer end, the rod 114 is secured to handle 118 and is rotatable therewith.

By virtue of this arrangement rotation of the handle 118 will cause the rod 114 to be screwed further into the tapped aperture in member 98, moving the rod 114 and handle 118 inwardly (to the left in Fig. 1). Since a bearing surface 120 on the handle 118 abuts the end of the tubular shaft 104, that shaft will also be moved to the left, carrying washer 108 therewith and thereby increasing the force exerted through spring 106 upon the face of plate 72. As a result, plate 72 and member 98 tend to be pulled towards one another, establishing an increased frictional engagement between the members 98 and 102 to prevent relative motion of those members, thereby locking the blade 10 in a selected position of tilt.

It will be noted that plate 72 holds the gears 60 and 62 in position upon the shaft 64, supports the gear member 66, and hence the shaft 68, and acts as a compression plate serving as an element of the tilting mechanism locking means.

Provision may be made to house the tilting mechanism over the gear train from wood chips, dirt and sawdust. Such a housing may comprise front and rear-metal portions 122 and 124 (Fig. 1). The front sheet-metal portion 122 underlies the lower gear member 66, extends upwardly adjacent the inner surface of the plate 72 (being apertured to accept the shoulder 70 of gear member 66 and shaft 64) and then extends into engagement with the outer face of the toothed portion of the member 102, overlying gear 60. The rear portion 124 is preferably provided with an offset flange underlying but intimately engaging the front portion 122. The rear portion 124 then extends upwardly, approximately following the contour of the front faces of webs 36a and 64a (being apertured to accept shafts 68 and 64), and engaging the inner face of the toothed portion of the member 102. The upper edges of both the front portion 122 and the rear portion 124 are desirably coated with a plastic sealant to provide an essentially dust proof engagement with the faces of the toothed portion of the member 102 yet permitting relative motion between that portion and the housing during tilting.

Figure 3:
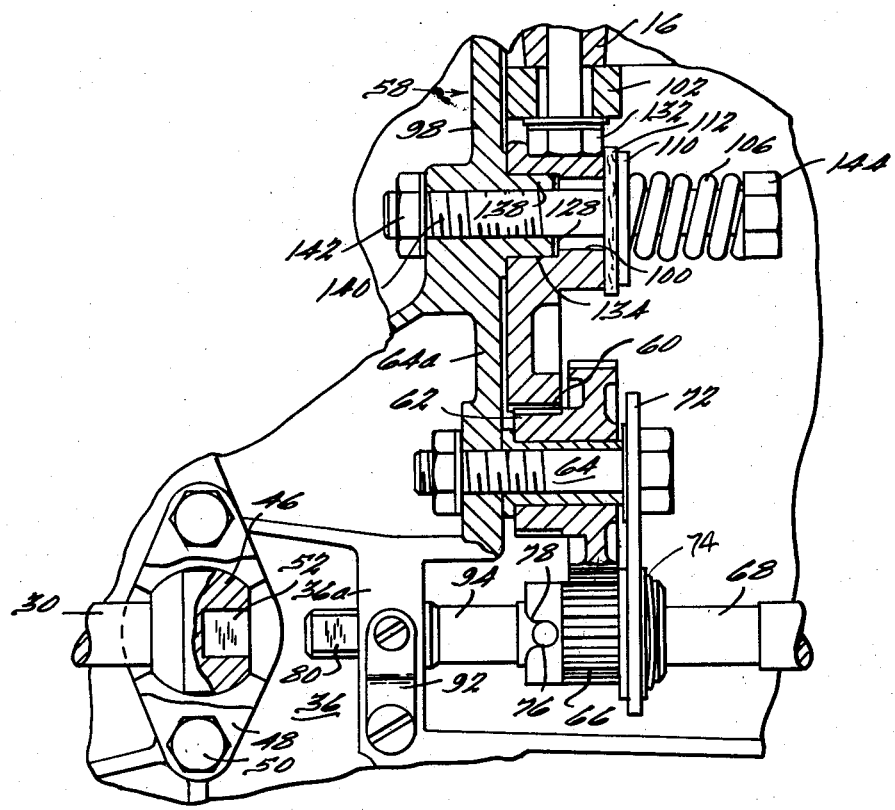
Fig. 3 is a sectional view, taken substantially along the line 3—3 of Fig. 1.

As is represented in the front elevational view of the housing front portion 122 in Fig. 3 of the drawings, side covers 126 are provided so that the gear train is totally enclosed.

As further insurance against the ingress of foreign material, the slot 100 (Fig. 3) may be covered by means of a dust plate 128 comprising an arcuate strip of sheet metal. Plate 128 is free to move within the arcuate slot in member 102, but is fixed with respect to the member 98 since an aperture in the plate 128 engages the shaft 114. Plate 128 may be viewed in cross section in Fig. 5 of the drawings.

The view shown in Fig. 5 of the drawings is drawn not only to show certain of the portions of the structure shown in Figs. 1 to 4 of the drawings more clearly, but also to represent certain modifications of that structure. Thus, the dust cover or gear housing comprising front and rear portions 122 and 124 is omitted in the structure shown in Fig. 5 and the tilting locking mechanism is modified.

The tilting mechanism, in the structure shown in Fig. 5, is restrained against accidental movement by means excluding plate 72 (contrary to the previously described arrangement) and consequently plate 72 terminates just above the shaft 64. A screw 140 passes through the aperture 100 in the trunnion member 102 and engages a tapped aperture in the frame member 98, a jam nut 142 being provided if desired. Interposed between the head 144 of the screw 140 and the front face of the trunnion member 102 are a spring 106, a metal washer 110 and a fiber washer 112. As screw 140 is tightened, a force is applied, via the spring 106 and the washers 110 and 112, to press the trunnion members 102 and 98 into more intimate engagement. By adjustment of the screw 140, the friction between the members 102 and 98 can be precisely controlled so that, with proper adjustment, the saw blade 10 may be readily tilted, but unintentional displacement of the blade 10 from its tilted position will not occur.

While it will be apparent that the embodiments of the invention herein disclosed are well calculated to fulfill

What is claimed is:

1. In a tilting arbor saw or the like, a frame including a table surface, a body tiltably mounted on the frame for tilting about a horizontal axis of tilting substantially parallel to said table surface, an elevating member having means thereon to rotatably receive a saw arbor, said member being movably carried by said body so that said means can be moved toward and away from said surface to elevate and lower a saw blade or the like carried by the member with respect to said surface, a first reversible rotary drive mechanism supported on the body and in continuous operative driving engagement with said elevating member to reversibly move it so as to move said means up and down, a second reversible rotary drive mechanism supported on the body and in continuous operative driving engagement with a part of said frame so that operation of the mechanism will tilt the body, said first and second drive mechanisms being spaced from each other in a direction parallel to said axis of tilting, and a reversible rotary drive shaft assembly extending parallel to said axis of tilting and supported on said body and including a driving portion and clutch means, at least a part of said shaft assembly being movable lengthwise thereof in a direction parallel to said axis of tilting to move said clutch means between first and second positions spaced from each other in a direction parallel to said axis of tilting, each of said first and second drive mechanisms having a clutch portion whereby it may be reversibly rotated, said portions being spaced from each other in a direction parallel to said axis of tilting, said clutch means being operatively engaged with said first mechanism clutch portion when in said first position and with said second mechanism clutch portion when in said second position whereby rotation of said shaft assembly by said driving portion will move the member when said clutch means is in said first position and tilt the body when said clutch means is in said second position.

2. In a tilting arbor saw, a frame, a body tiltably mounted on the frame and having means to carry a saw arbor, said frame having a fixed rack member curved about the axis of tilt of said body, a tilt drive shaft carried by said body and extending parallel to the axis of tilt, a gear train carried by said body and meshing with said rack, said gear train being driven by said shaft, and a dust shield carried by said body and encasing said gear train and slidably but sealingly engaging opposite side faces of said rack.

3. In a tilting arbor saw, a frame, a body tiltably mounted on the frame for tilting about a horizontal axis, said body having means to carry a saw arbor, said frame having a fixed rack member curved about said horizontal axis with the rack teeth located below said axis and facing downwardly, a gear post carried by said body and projecting parallel to said axis below said teeth and rotatably carrying a gear in mesh with said teeth, a plate carried by said post and extending downwardly, the lower part of said plate rotatably supporting a hollow gear meshing with said first mentioned gear, and a drive shaft projecting through and supported by said gear and at another point by said body and adapted upon rotation to rotate said gears and thus tilt said body.

References Cited in the file of this patent

UNITED STATES PATENTS

| | | |
|---|---|---|
| 114,616 | Snell | May 9, 1871 |
| 163,558 | Weeks et al. | May 18, 1875 |
| 599,245 | Merrill | Feb. 15, 1898 |
| 1,041,927 | Weseman | Oct. 22, 1912 |
| 1,057,775 | Ricketts | Apr. 1, 1913 |
| 1,244,584 | Carter | Oct. 30, 1917 |
| 1,247,234 | Dewey | Nov. 20, 1917 |
| 1,821,113 | Neighbour | Sept. 1, 1931 |
| 1,841,939 | De Koning et al. | Jan. 19, 1932 |
| 2,156,200 | Smyers | Apr. 25, 1939 |
| 2,168,282 | Tautz | Aug. 1, 1939 |
| 2,300,395 | Becker | Nov. 3, 1942 |
| 2,328,676 | Rich | Sept. 7, 1943 |
| 2,568,888 | Unverzagt | Sept. 25, 1951 |
| 2,695,638 | Gaskell | Nov. 30, 1954 |